US009922056B2

United States Patent
Hapse et al.

(10) Patent No.: US 9,922,056 B2
(45) Date of Patent: Mar. 20, 2018

(54) PRIORITY BASED FAILOVER FOR DATABASES

(71) Applicant: International Business Machines Corporation, Armonk, NY (US)

(72) Inventors: Juilee S. Hapse, Pune (IN); Priyanka K. Joshi, Sydney (AU); Nishant Sinha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 14/593,176

(22) Filed: Jan. 9, 2015

(65) Prior Publication Data

US 2016/0203051 A1  Jul. 14, 2016

(51) Int. Cl.
| | | |
|---|---|---|
| *G06F 17/30* | (2006.01) | |
| *G06F 17/00* | (2006.01) | |
| *G06F 11/07* | (2006.01) | |
| *G06F 11/14* | (2006.01) | |
| *G06F 11/20* | (2006.01) | |
| *G06F 11/30* | (2006.01) | |

(52) U.S. Cl.
CPC ...... *G06F 17/30289* (2013.01); *G06F 11/079* (2013.01); *G06F 11/0709* (2013.01); *G06F 11/0751* (2013.01); *G06F 11/0793* (2013.01); *G06F 11/1474* (2013.01); *G06F 11/2028* (2013.01); *G06F 11/2035* (2013.01); *G06F 11/3034* (2013.01); *G06F 2201/80* (2013.01); *G06F 2201/805* (2013.01); *G06F 2201/88* (2013.01)

(58) Field of Classification Search
CPC . G06F 8/65; G06F 21/10; G06F 21/34; G06F 2221/0784; G06F 8/61; G06F 21/105; G06F 21/121; G06F 11/3684; G06F 17/30132; G06F 17/5045
See application file for complete search history.

(56) References Cited

U.S. PATENT DOCUMENTS

| | | | | |
|---|---|---|---|---|
| 6,983,362 | B1 * | 1/2006 | Kidder | G06F 11/0709 |
| | | | | 707/999.002 |
| 7,370,235 | B1 * | 5/2008 | Gulve | G06F 11/1443 |
| | | | | 711/162 |
| 7,555,547 | B2 * | 6/2009 | Singh | H04L 67/322 |
| | | | | 709/201 |
| 2006/0047925 | A1 * | 3/2006 | Perry | G06F 11/1474 |
| | | | | 711/162 |
| 2009/0063501 | A1 | 3/2009 | Buckler et al. | |

OTHER PUBLICATIONS

Appendix P.: List of IBM Patents or Patent Applications Treated as Related, Dated Oct. 9, 2015, 2 pages.

(Continued)

*Primary Examiner* — Yicun Wu
(74) *Attorney, Agent, or Firm* — Brian M. Restauro

(57) ABSTRACT

Embodiments of the present invention provide methods, systems, and computer program products for prioritizing database failover. In one embodiment, an order in which to failover databases is determined based on a priority order of databases and the time at which the failover process occurs, which can be used to help reduce possible down time users can experience while waiting for the database most important to them to be failed over.

13 Claims, 4 Drawing Sheets

(56) References Cited

OTHER PUBLICATIONS

U.S. Appl. No. 14/880,330, Entitled "Priority Based Failover for Databases", filed Oct. 12, 2015.

IBM, "Configuring the On Demand Router for Multi-Cluster Failover and Load Balancing Routing", pp. 1-4, provided in provided in search report dated Jul. 24, 2014, <http://pic.dhe.ibm.com/infocenter/wveinfo/v7r0/index.jsp?topic=%2Fcom.ibm.websphere.virtualenterprise.doc%2Fodoe_task%02Ftodrcustom.html)>.

IBM, "Configuring a custered environment using DB2 High Availability Instance Configuration Utility (db2haicu)", pp. 1-2, provided by inventors in disclosure dated Jul. 3, 2014,<http://www-01.ibm.com/support/knowledgecenter/SSEPGG_9.7.0/com.ibm.db2.luw.admin.ha.doc/doc/t0052800.html>.

* cited by examiner

PRIORITY BASED FAILOVER FOR DATABASES

FIELD OF THE INVENTION

The present invention relates generally to the field of database failover, particularly priority based failover for databases.

BACKGROUND OF THE INVENTION

A database typically refers to a central storage location for information that a user of a program, such as a database management system, can access, share, and/or otherwise modify. Despite best maintenance practices, databases can still fail. Common examples of failure can include system crashes, user error, statement failure, application software errors, network failure, and media failure. Hardware malfunction, a bug in the database software, or the operating system itself are common instances that could cause one of the failures described above. Each time a database fails, a user of a database can lose information and/or halt transactions being conducted on the failed database.

High Availability and Disaster Recovery (HADR) refers to data replication technology that provides a high availability solution for both partial and complete failures of a database. HADR protects against data loss on databases by performing a process known as failover. The failover process replicates data changes from a source database, called the primary, to a target database, called the standby. In the case of failure, the failover of databases hosted on the primary server to the standby server typically occurs in sequential order. On average, each database failover process takes several minutes. Thus, users of a database can experience a down time of a few minutes or longer before databases are failed over and input-output can be resumed.

SUMMARY

Embodiments of the present invention provide systems, methods, and program products for prioritizing database failover such that databases with higher activity use at the time of failover are failed over first. In one embodiment of the present invention, a method is provided comprising: monitoring one or more activities conducted on a plurality of databases during a plurality of time intervals, wherein the plurality of time intervals comprises a current time interval and one or more time intervals preceding the current time interval; generating a plurality of priority orders for the plurality of databases, wherein each priority order is associated with one of the plurality of time intervals; receiving an indication that a group of databases has failed; and responsive to receiving the indication, determining an order in which to failover the group of databases based, at least in part, on the priority order associated with the current time interval.

DETAILED DESCRIPTION

Embodiments of the present invention recognize inefficiency of failover in sequential order. For example, the last database to failover may, in fact, be the most active database in use and, therefore, the database that would be desired to be failed over first. Accordingly, embodiments of the present invention recognize the need to provide more efficient failover processes for databases. Embodiments of the present invention provide system, methods, and computer program products for failover, in accordance with a priority of each database based on their usage, both current and historical. As discussed in greater detail later in this specification, embodiments of the present invention can be used to failover the databases having the highest priorities first. Accordingly, embodiments of the present invention can help reduce possible down time users can experience while waiting for databases most used to be failed over.

Figure 1:
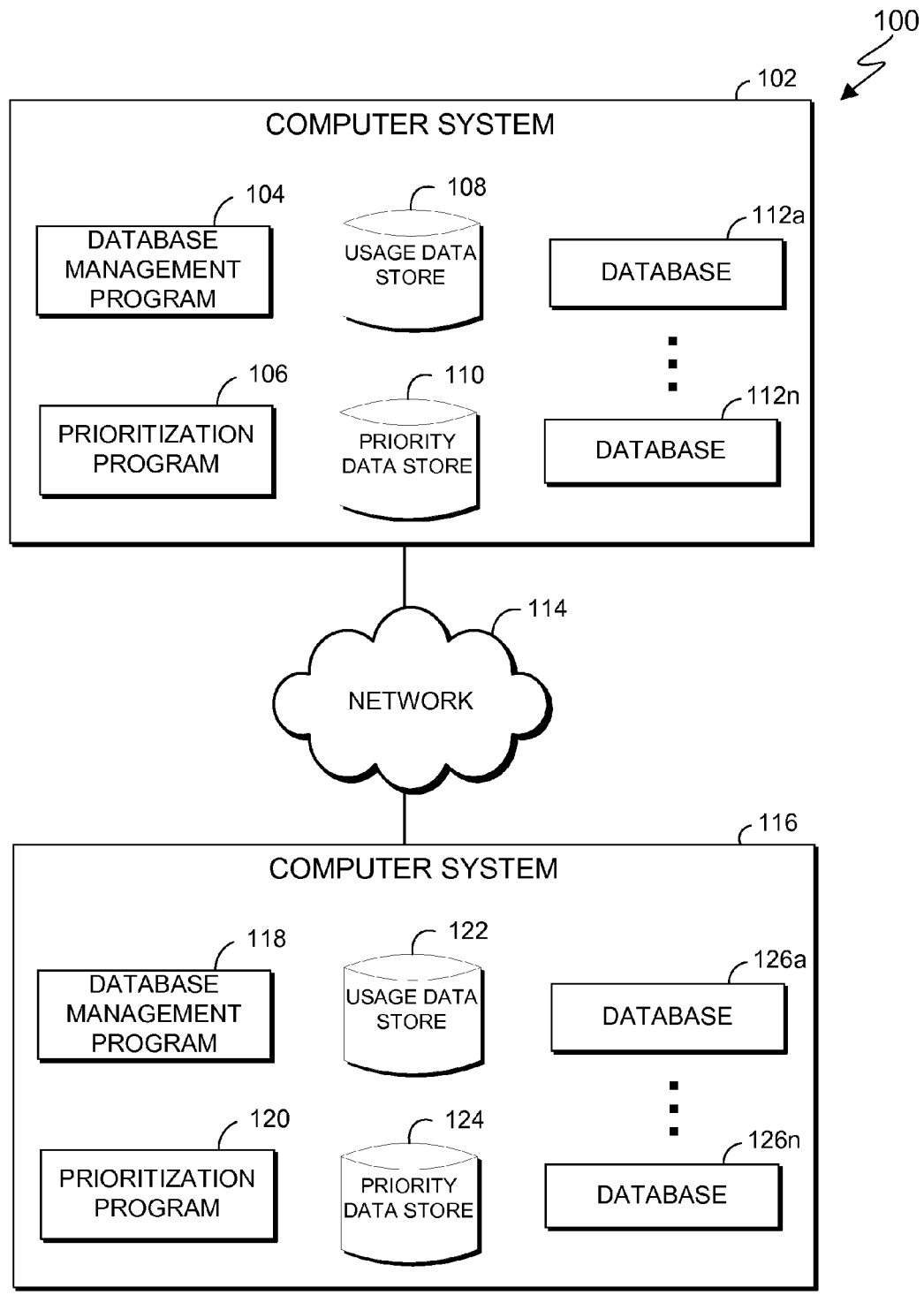
FIG. 1 is a functional block diagram of a computing environment, in accordance with an embodiment of the present invention.

FIG. 1 is a functional block diagram of computing environment 100, in accordance with an embodiment of the present invention. Computing environment 100 includes computer system 102 and computer system 116. Computer system 102 and computer system 116 can be desktop computers, laptop computers, specialized computer servers, or any other computer systems known in the art. In certain embodiments, computer system 102 and computer system 116 represent computer systems utilizing clustered computers and components to act as a single pool of seamless resources when accessed through network 114. In general, computer system 102 and computer system 116 are representative of any electronic devices, or combination of electronic devices, capable of executing machine readable program instructions, as described in greater detail with regard to FIG. 4.

The phrase "primary computer system", as used herein, refers to a computer system of computing environment 100 that is designated as the principal computer system that processes database activity. An "activity" can represent any command performed on databases 112*a-n* (e.g., reads, selects, inserts, updates, deletes etc.). Each activity is associated with a timestamp that corresponds to the time at which that activity was conducted on a database. The phrase "standby computer system" refers to a computer system of computing environment 100 that hosts a mirror of the databases of the primary computer system, and is brought online in the event the primary computer system experiences a failure. A "failure", as used herein, can be any abnormal termination, interruption, or error in software and/or hardware in computer system 102 or another component of computing environment 100 that affects access to one or more of databases 112*a-n*. Any of the computer systems of computing environment 100 can serve as the primary computer system.

Computer system 102 includes database management program 104, usage data store 108, prioritization program 106, priority data store 110, and databases 112*a-n*. Database management program 104 monitors activity conducted on databases 112*a-n* for one or more consecutive days at specified consecutive time intervals (e.g., consecutive, five minute intervals during one or more 24-hour days) via network 114 (e.g., using TCP/IP). Database management program 104 saves monitored activity conducted on databases 112*a-n* in a current usage file and a historic usage file in usage data store 108.

A "current usage file", as used herein, refers to a file that lists calculated activity counts (i.e., the sum total of one or more activities conducted on each database) for each of databases 112*a-n* during the most recent time interval for the most recent day that database management program 104 monitored database activity (i.e., the current time interval). At the end of each time interval, the activity counts from the current usage file are appended to a historic usage file and the current usage file is populated with calculated activity counts for the next time interval (i.e., what is now the current time interval). A "historic usage file", as used herein, refers to a file that lists the activity counts for each of databases 112*a-n* during one or more consecutive time intervals on the current day and one or more days preceding the current day.

Usage data store 108 stores the current usage file and the historic usage file received from database management program 104. Usage data store 108 can be implemented using any storage media known in the art.

Prioritization program 106 accesses usage data store 108 to create and/or update a priority file. A "priority file", as used herein, refers to a file containing rankings associated with each database on computer system 102 that determines the priority order in which those databases are failed over. In this embodiment, the priority order is based, at least in part, on the total activity counts in the historic and current usage files, as will be discussed in greater detail in step 206 of FIG. 2. The priority file is updated each time the current and historic usage file are updated. Prioritization program 106 stores the priority file in priority data store 110.

Priority data store 110 stores the priority file received from prioritization program 106. Priority data store 110 can be implemented using any storage media known in the art.

Databases 112*a-n* can be stored on any storage media known in the art. For example, databases 112*a-n* can be stored on a tape library, optical library, one or more independent hard disk drives, or multiple hard disk drives in a redundant array of independent disks (RAID). Similarly, databases 112*a-n* can be implemented with any suitable storage architecture known in the art, such as a relational database, an object-orientated database, and/or one or more tables. In general, a database refers to a central storage location for information organized in such a way that a computer program, such as database management program 104, can select, modify, and store desired pieces of data. Where computer system 102 is serving as the primary computer system and computer system 116 is serving as the standby computer system, data on databases 112*a-n* is mirrored to databases 126*a-n*, and database management program 104 fails over databases 112*a-n* hosted on computer system 102 to databases 126*a-n*.

Network 114 can be, for example, a local area network (LAN), a wide area network (WAN) such as the Internet, or a combination of the two, and include wired, wireless, or fiber optic connections. In general, network 114 can be any combination of connections and protocols that will support communications between computer system 102, and computer system 116, in accordance with an embodiment of the invention.

Computer system 116 includes database management program 118, prioritization program 120, usage data store 122, priority data store 124, and databases 126*a-n*, which are functionally equivalent to database management program 104, prioritization program 106, usage data store 108, priority data store 110, and databases 112*a-n*, and, therefore, a separate discussion of these components will not be repeated herein. Where computer system 116 is serving as the primary computer system and computer system 102 is serving as the standby computer system, data on databases 126*a-n* is mirrored to databases 112*a-n*, and database management program 118 fails over databases 126*a-n* hosted on computer system 116 to databases 112*a-n*.

Figure 2:
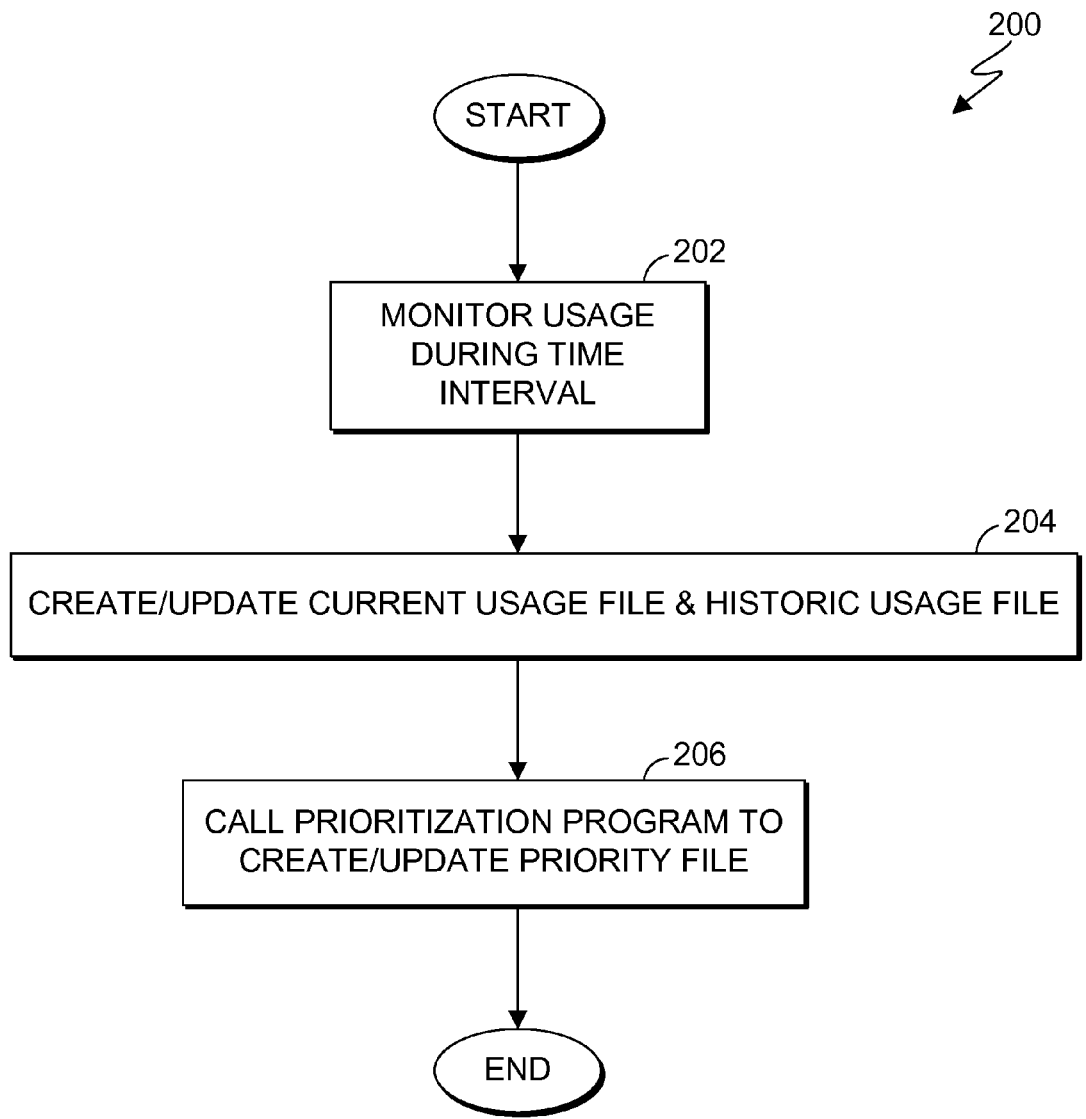
FIG. 2 is a flowchart illustrating operational steps for generating a priority order in which to failover databases, in accordance with an embodiment of the present invention.

FIG. 2 is a flowchart 200 illustrating operational steps for generating a priority order in which to failover databases, in accordance with an embodiment of the present invention. For illustrative purposes, the following discussion is made with respect to computer system 102 serving as a primary computer system and computer system 116 serving as a standby computer system; however, it should be understood that either of the computer systems in computing environment 100 can serve as a primary computer system, and the other computer system in computing environment 100 can be the standby computer system.

In step 202, database management program 104 monitors database usage on computer system 102 during a time interval. In this embodiment, the time interval can be any specified time interval, such as a time interval that optimizes database performance while collecting database usage data. For example, the time interval can be every minute, 5 minutes, 10 minutes, 15 minutes, 30, minutes 45 minutes, or 60 minutes. In this embodiment, database management program 104 queries computer system 102 at the end of a time interval and records all activities conducted on each of databases 112*a-n* during that time period. Again, an activity can represent any command performed on databases 112*a-n* (e.g., reads, selects, inserts, updates, deletes etc.). For example, when using a 5 minute time interval, database management program 104 could query computer system 102 for activity conducted during a five minute interval between 8:55 am and 9:00 am and record that a "select" and "read" activity was conducted on database 112*b* during that time interval.

In step 204, database management program 104 creates and/or updates a current usage file and a historic usage file. In this embodiment, database management program 104 creates a current usage file by calculating the activity count for each database by adding all activities performed on each of databases 112*a-n* during the current time interval. For example, database management program 104 could identify that database 112*a* had one select and one read as activities performed during the current time interval. Database management program 104 would then add each activity (e.g., select and read) to calculate an activity count of 2 for database 112*a* for the current time interval. Database management program 104 then stores the current usage file in data storage 110. The process repeats until the activity counts for each of the databases hosted on computer system 102 have been calculated for the current time interval.

In this embodiment, database management program 104 updates the current usage file at the conclusion of each time interval by replacing the activity counts stored in the current usage file for the concluded time interval with calculated activity counts for the next time interval, which is now the current time interval. That is, database management program 104 overwrites all activity counts for each of databases 112*a-n* during the concluded time interval with the one or more activity counts for each database for the current time interval. Each time the current usage file is updated, the timestamp associated with each activity conducted on a database is recorded to identify when those activities were conducted. For example, the timestamps for activities conducting during a 5 minute time interval could indicate that those activities took place between 9:00 am and 9:05 am on a particular day. Database management program 104 then stores the current usage file in data storage 110.

In this embodiment, database management program 104 creates and/or updates a historic usage file at the conclusion of each time interval by appending the activity counts for the concluded time interval taken from the current usage file. For example, the historic usage file could contain an activity count of 50 for database 112a and an activity count of 75 for 112b for an interval preceding the current time interval. During the current time interval, an activity count of 20 for database 112a and an activity count of 25 for database 112b are stored in the current usage file. At the conclusion of the current interval, activity counts for databases 112a and 112b are appended to the historic file, such that the historic file contains the activity counts of 50 for database 112a and activity counts of 75 for database 112b for the interval preceding the current interval, in addition to the activity counts of 20 for database 112a and activity counts of 75 for database 112b for the concluded time interval. Contents of the current usage file are populated with activity counts of the next interval and so on. Database management program 104 then stores the historic usage file in data storage 110.

In step 206, database management program 104 calls prioritization program 106 to create a priority file containing priority orders of each database for each time interval. In this embodiment, prioritization program 106 accesses usage data store 108 and reads the current and the historic usage file to determine activity counts for each database at each time interval. Prioritization program 106 calculates a priority order for each time interval by ranking the databases based on their activity counts during that time interval, from most activity counts to least. The database with the highest total activity count during a particular time interval is assigned the highest position (i.e., rank) in the priority order for that time interval; the database with the second highest total activity count during that time interval is assigned the second highest position in the priority order; the database with the third highest total activity count during that time interval is assigned the third highest position in priority order, and so on for each of databases 112a-n on computer system 102.

For example, prioritization program 106 could generate a priority order for a specified 5 minute time interval that occurred between 9:00 am and 9:05 am on the current and two preceding days. Prioritization program 106 adds the activity counts accessed in the current usage file from the current day (e.g., 20 activity counts for database 112a, 50 activity counts for database 112b, and 100 activity counts for database 112c that occurred between 9:00 am and 9:05 am on the current day) to the activity counts accessed in the historic usage file for the same time interval from the two preceding days (e.g., 30 activity counts for database 112a, 25 activity counts for database 112b, and 75 activity counts for database 112c from the previous day and 40 activity counts for database 112a, 35 activity counts for database 112b and 70 activity counts for database 112c from a consecutive preceding day between 9:00 am and 9:05 am) to yield a total activity count of 90 for database 112a, a total activity count of 110 for database 112b, and a total activity count of 245 for database 112c. During the 5 minute interval between 9:00 am and 9:05 am, database 112c is assigned the highest position in the priority order with a total activity count of 245; database 112b is assigned the second highest position in the priority order with a total activity count of 110; and database 112c is assigned the third highest position in the priority order with a total activity of 90 during the same five minute interval over the course of those three days. Prioritization program 106 saves the priority orders for each database at the specified time period in the priority file. Processing repeats until each database is ranked in order from most activity counts to least activity counts during each time interval. Prioritization program 106 then transmits the priority file to priority data store 110 for storage. Prioritization program 106 updates the priority file each time the current usage file and the historic usage file are updated, such that the rankings reflect priorities based on the most recent activity counts.

Accordingly, in this embodiment, prioritization program 106 generates a priority order for each database that can be used in the event of failover.

Figure 3:
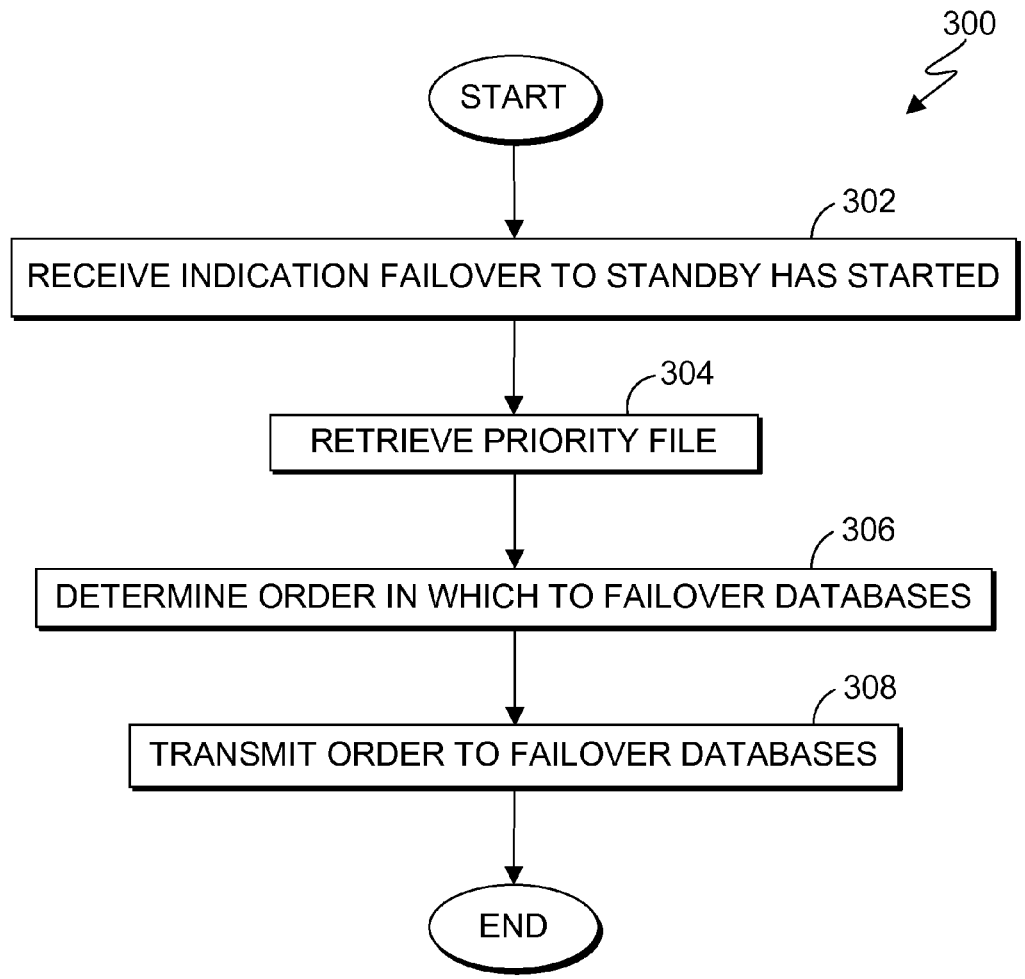
FIG. 3 is a flowchart illustrating operational steps for failing over databases based on a priority order and time at which the failover is performed, in accordance with an embodiment of the present invention.

FIG. 3 is a flowchart 300 illustrating operational steps for failing over databases based on the priority order in the priority file and time at which the failover is performed, in accordance with an embodiment of the present invention. Again, for illustrative purposes, the following discussion is made with respect to computer system 102 serving as a primary computer system and computer system 116 serving as a standby computer system; however, it should be understood that either of the computer systems in computing environment 100 can serve as a primary computer system, and the other computer system in computing environment 100 can be the standby computer system.

In step 302, prioritization program 106 receives an indication from database management program 104 that a failover to computer system 116 has started. In this embodiment, the indication from database management program 104 could comprise an indication that a group of databases has failed and a list of the failed databases from the group of databases that failed. In other embodiments, prioritization program 106 could query database management program 104 for an indication that the failover process has started.

In step 304, prioritization program 106 retrieves the priority file from priority data store 110.

In step 306, prioritization program 106 calculates the order in which to failover one or more failed databases. In this embodiment, prioritization program 106 calculates the order in which to failover one or more failed databases by reading the priority file and identifying the priority order of the one or more failed databases for the time interval in which the moment of failure occurred. For example, as between two failed databases, database 112a and database 112b, prioritization program 106 could identify from the priority file that database 112a has a higher position in the priority order than database 112b during the time interval at the moment of failure. Prioritization program 106 then assigns database 112a the highest priority order and database 112b the second highest priority order. Unless there is a delay between failure and starting failover, the time interval here will be the current time interval.

In step 308, prioritization program 106 transmits the order for that interval in which to failover databases to database management program 104. Database management program 104 then fails over the each of the failed databases of databases 112a-n to databases 126a-n hosted on computer system 116, in accordance with the priority order determined at step 306 from the priority file by first failing over the database having the first position in the priority order, followed by the database having the second position in the priority order, and so on in order of priority.

Accordingly, in this embodiment, the failover process is performed and each failed database from the group of databases hosted on computer system 102 is failed over according to the order that ensures that the database with the most activity conducted on it during the time interval in which the moment of failure occurred will be failed over first, which can help reduce possible down time users can experience while waiting for the databases most used to be failed over. When accessed at the time a failure occurs, a ranking of each database at a particular time interval, based on amounts of activity during that time interval currently and historically, enables database management program 104 to failover databases with the most activity conducted on it during the time interval in which the moment of failover will be failed over first, thereby minimizing down time users can experience when waiting for those databases to be failed over.

Figure 4:
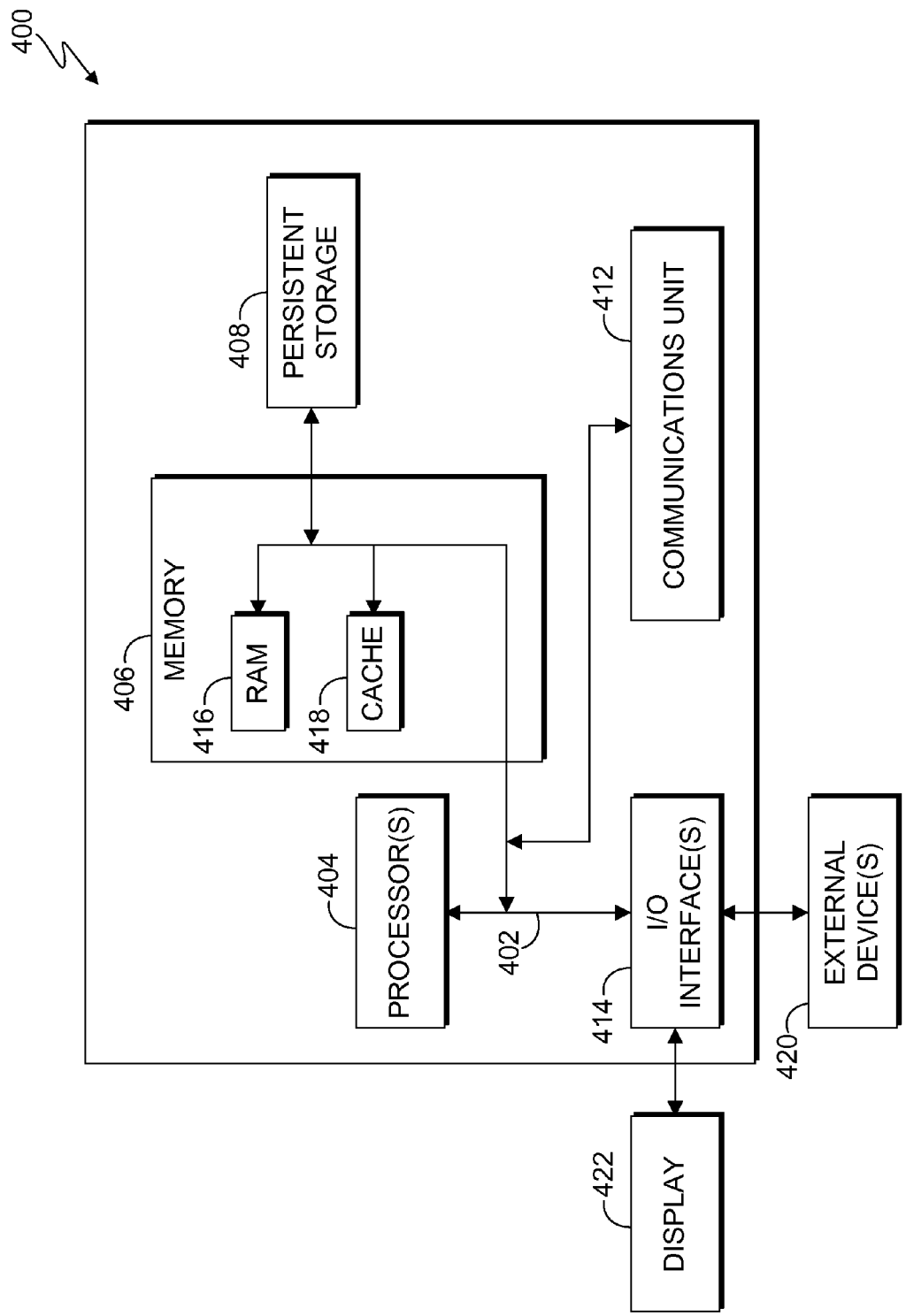
FIG. 4 depicts a block diagram of components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 114). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for prioritizing database failover, the computer program product comprising:
   one or more computer-readable storage media and program instructions stored on the one or more computer-readable storage media, the program instructions comprising:
   program instructions to monitor one or more activities conducted on a plurality of databases during a plurality of time intervals,
      wherein the plurality of time intervals comprises a current time interval and one or more time intervals preceding the current time interval,
      wherein an activity comprises commands performed on respective databases of the plurality of databases having associated timestamps that correspond to the time at which each respective activity was conducted;
   program instructions to generate a plurality of priority orders for the plurality of databases, based on a respective activity count for each database in the plurality of databases and a respective time interval, wherein each priority order is associated with one of the plurality of time intervals;
   program instructions to receive an indication that a group of databases has failed wherein a failure denotes an interruption of service;

program instructions to rank the plurality of databases based on one or more activities conducted at a time the group of databases have failed; and program instructions to, responsive to receiving the indication, determine an order in which to failover the group of databases based, at least in part, on the priority order associated with the current time interval.

2. The computer program product of claim 1, wherein the program instructions to monitor one or more activities conducted on a plurality of databases during a plurality of time intervals further comprise:

program instructions to monitor one or more activities conducted on the plurality of databases during the plurality of time intervals on a first day and during the plurality of time intervals on one or more days preceding the first day.

3. The computer program product of claim 1, wherein the program instructions stored on the one or more computer-readable storage media further comprise:

program instructions to calculate an activity count for each of the plurality of databases during the current time interval; and program instructions to append the activity count for each of the plurality of databases during the current time interval to a historic file, wherein the historic file comprises activity counts for each of the plurality of databases during the current time interval on a first day and one or more days preceding the first day.

4. The computer program product of claim 1, wherein the program instructions to generate a plurality of priority orders for the plurality of databases comprise:

program instructions to generate a priority order at the conclusion of each of the plurality of time intervals; and program instructions to store the priority order generated at the conclusion of the current time interval in a priority file.

5. The computer program product of claim 4, wherein the priority order generated at the conclusion of the current time interval comprises a ranking of the plurality of databases based on one or more activities conducted on each of the plurality of databases during the current time interval on a first day, and one or more activities conducted on each of the plurality of databases during the current time interval on one or more days preceding the first day.

6. The computer program product of claim 1, wherein the program instructions to receive an indication that a group of databases has failed comprise:

program instructions to receive a list of failed databases of the group of databases from a database management program.

7. The computer program product of claim 4, wherein the program instructions to determine an order in which to failover the group of databases based, at least in part, on the priority order associated with the current time interval comprise:

program instructions to generate an order in which to failover the group of databases according to a rank of each database of the group of databases accessed in the priority file.

8. A computer system for prioritizing database failover, the computer system comprising:
one or more computer processors;
one or more computer-readable storage media; and program instructions stored on the one or more computer-readable storage media for execution by at least one of the one or more processors, the program instructions comprising:

program instructions to monitor one or more activities conducted on a plurality of databases during a plurality of time intervals,
wherein the plurality of time intervals comprises a current time interval and one or more time intervals preceding the current time interval,
wherein an activity comprises commands performed on respective databases of the plurality of databases having associated timestamps that correspond to the time at which each respective activity was conducted;

program instructions to generate a plurality of priority orders for the plurality of databases, based on a respective activity count for each database in the plurality of databases and a respective time interval, wherein each priority order is associated with one of the plurality of time intervals;

program instructions to receive an indication that a group of databases has failed wherein a failure denotes an interruption of service;

program instructions to rank the plurality of databases based on one or more activities conducted at a time the group of databases have failed; and program instructions to, responsive to receiving the indication, determine an order in which to failover the group of databases based, at least in part, on the priority order associated with the current time interval.

9. The computer system of claim 8, wherein the program instructions to monitor one or more activities conducted on a plurality of databases during a plurality of time intervals further comprise:

program instructions to monitor one or more activities conducted on the plurality of databases during the plurality of time intervals on a first day and during the plurality of time intervals on one or more days preceding the first day.

10. The computer system of claim 8, wherein the program instructions stored on the one or more computer-readable storage media further comprise:

program instructions to calculate an activity count for each of the plurality of databases during the current time interval; and program instructions to append the activity count for each of the plurality of databases during the current time interval to a historic file, wherein the historic file comprises activity counts for each of the plurality of databases during the current time interval on a first day and one or more days preceding the first day.

11. The computer system of claim 8, wherein the program instructions to generate a plurality of priority orders for the plurality of databases comprise:

program instructions to generate a priority order at the conclusion of each of the plurality of time intervals; and program instructions to store the priority order generated at the conclusion of the current time interval in a priority file.

12. The computer system of claim 11, wherein the priority order generated at the conclusion of the current time interval comprises a ranking of the plurality of databases based on one or more activities conducted on each of the plurality of databases during the current time interval on a first day, and one or more activities conducted on each of the plurality of databases during the current time interval on one or more days preceding the first day.

13. The computer system of claim 11, wherein the program instructions to determine an order in which to failover the group of databases based, at least in part, on the priority order associated with the current time interval comprise:
   program instructions to generate an order in which to failover the group of databases according to a rank of each database of the group of databases accessed in the priority file.

* * * * *